(12) United States Patent
Bacardit

(10) Patent No.: US 7,051,640 B2
(45) Date of Patent: May 30, 2006

(54) PNEUMATIC BRAKE BOOSTER WITH REDUCED DEAD TRAVEL AND BRAKING SYSTEM COMPRISING SUCH A BOOSTER

(75) Inventor: Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 10/959,476

(22) Filed: Oct. 6, 2004

(65) Prior Publication Data

US 2005/0072297 A1 Apr. 7, 2005

(30) Foreign Application Priority Data

Oct. 6, 2003 (FR) .................................. 03 11696

(51) Int. Cl.
*F15B 9/10* (2006.01)

(52) U.S. Cl. ..................................... 91/369.1; 91/369.2

(58) Field of Classification Search ............... 91/369.1, 91/369.2, 376 R, 515
See application file for complete search history.

(56) References Cited

U.S. PATENT DOCUMENTS

| 5,475,977 A | * | 12/1995 | Gautier et al. | ............. | 60/547.1 |
| 5,572,870 A | * | 11/1996 | Castel et al. | ................... | 60/553 |
| 6,591,734 B1 | * | 7/2003 | Bacardit | ..................... | 91/369.2 |
| 6,880,447 B1 | * | 4/2005 | Harth et al. | ................ | 91/369.1 |

* cited by examiner

*Primary Examiner*—Thomas E. Lazo
(74) *Attorney, Agent, or Firm*—Leo H. McCormick, Jr.; Sarah Taylor

(57) ABSTRACT

A pneumatic brake booster with reduced dead travel comprising a skirt (10) which can move in a sealed manner in a casing, delimiting a low-pressure chamber and a variable-pressure chamber, with respect to a pneumatic piston (16) over a certain travel. The displacement of the pneumatic piston being controlled by the skirt in a first direction when the skirt comes into contact with a first face of an annular plate (100) which is arranged in the low-pressure chamber and is fastened rigidly to the pneumatic piston, and the displacement of the piston in a second direction is controlled by an elastic means mounted in the low-pressure chamber and bearing by one of its ends on a second face of the annular plate (100).

17 Claims, 5 Drawing Sheets

PNEUMATIC BRAKE BOOSTER WITH REDUCED DEAD TRAVEL AND BRAKING SYSTEM COMPRISING SUCH A BOOSTER

The present invention relates mainly to a pneumatic brake booster with reduced dead travel and to a braking system comprising such a booster.

The prior art discloses a braking device with reduced dead travel comprising a master cylinder actuated by a control rod actuated by a driver, the action of the driver being amplified by a pneumatic booster allowing a reduction in the pedal travel necessary for obtaining a braking action.

The booster of known type described for example in document FR 2 696 143 comprises a casing in which there is slidably mounted with sealing a skirt dividing the interior space of the casing into a low-pressure chamber and a variable-pressure chamber.

The skirt comprises a central passage in which there is mounted a pneumatic piston provided with a three-way valve controlled by the control rod, placing the low-pressure chamber and the working chamber in communication at rest and isolating the low-pressure chamber from the working chamber and placing the working chamber in communication with a low-pressure fluid source.

The skirt is mounted so that it can move axially with respect to the pneumatic piston over a certain travel at the start of braking. Consequently, when the driver presses on the brake pedal, the working chamber is isolated from the low-pressure chamber and fills with high-pressure pneumatic fluid. Owing to the pressure differential between the low-pressure chamber and the working chamber, the skirt is displaced in the direction of the low-pressure chamber without taking the pneumatic piston along with it; consequently, the driver need not depress the pedal further to keep the working chamber supplied with high-pressure pneumatic fluid.

The displacement of the skirt is transmitted to a primary piston of a master cylinder, causing closure of the valves of the master cylinder and a rise in pressure at the brakes.

Beyond a certain defined travel, the skirt bears on a radially external part of the pneumatic piston, their movements then being connected. From this moment on, the driver must depress the control rod further to obtain an increase in the braking intensity. However, he will not have "seen" from the brake pedal the travel necessary for closing the master cylinder valves that does not produce a rise in pressure in the brakes, also known as dead travel.

This device, which is called a concealed dead travel device since it conceals the dead travels from the driver, is entirely satisfactory but still forms the subject of research to simplify it so that its complexity can be reduced, the ease of mounting it can be improved and also its cost price can be reduced. In fact, the skirt has a very complex shape because it passes around the pneumatic piston and needs to be produced in a multi-pass stamping operation, which is long and costly.

It is consequently an aim of the present invention to offer a braking device with low actuating travel having a simple structure, being easily adaptable to the known device and also accepting the integration of means for assisting emergency braking.

It is another aim of the present invention to offer a braking device with low actuating travel which is simple to assemble and of reasonable cost price.

The aims stated above are achieved by a pneumatic brake booster comprising a skirt which is able to slide freely with respect to a pneumatic piston over a defined travel, and a return spring for returning the pneumatic piston to the rest position, said piston bearing on an annular plate which is fixed with respect to the piston, the skirt being interposed between the annular plate and the piston, and the skirt coming into contact with said annular plate when the skirt has completed the defined travel.

In other words, the axial movement of the piston of the booster according to the present invention, allowing control over the level of braking by way of the three-way valve, is controlled by a single annular component which is fixed with respect to the piston.

The main subject of the present invention is a pneumatic brake booster comprising a casing of longitudinal axis formed by first and second shells connected by their radially external ends, in which casing a skirt of longitudinal axis is slidably mounted with sealing, said skirt dividing the interior space of the casing into a low-pressure front chamber and into a variable-pressure rear chamber, a pneumatic piston of longitudinal axis mounted in a central orifice in said skirt, a return spring for returning the pneumatic piston to the rest position being mounted in the low-pressure chamber between the first shell and an annular plate which is arranged in the low-pressure chamber substantially perpendicularly to the longitudinal axis and is connected rigidly to the pneumatic piston by axial arms passing through the skirt, a three-way valve actuated by a control rod being mounted in a longitudinal passage bored into the pneumatic piston, said control rod being connected by a first longitudinal end to a brake pedal and a second end of said control rod being received in a receiving cavity made in a first longitudinal end of a plunger, a second longitudinal end of the plunger opposite the first end of the plunger being guided in the pneumatic piston, said plunger comprising a transverse surface for applying the force of the control rod to a piston of a master cylinder by way of a reaction device, said skirt being able to slide axially relative to the pneumatic piston over a defined travel in a first phase of a braking action, said skirt transmitting a pneumatic boost force to the hydraulic piston of the master cylinder via its central part, characterized in that when the skirt has completed said defined travel, said skirt takes the pneumatic piston along with it by way of said annular plate.

Another subject of the present invention is a booster characterized in that the pneumatic piston is substantially cylindrical and is slidably mounted with sealing in a longitudinal end of the skirt directed toward the pedal.

Another subject of the present invention is a booster characterized in that said longitudinal end of the skirt directed toward the pedal comprises a hollow shaft whose inside diameter is substantially equal to the outside diameter of the pneumatic piston.

Another subject of the present invention is a booster characterized in that the skirt transmits the booster force to the master cylinder piston by way of an annular element bearing against the skirt and carried along by said skirt upon a braking action, comprising a radially external first part bearing against the skirt, a radially central second part (92) bearing against the front face of the piston (16), and a radially internal third part (94) bearing against a tail of the master cylinder piston.

Another subject of the present invention is a booster characterized in that there are four axial arms which are angularly distributed in a uniform manner and pass through the skirt by way of openings made in the second central part of the annular first element.

Another subject of the present invention is a booster characterized in that an elastic means is mounted between the radially external first part of the annular element and the annular plate.

Another subject of the present invention is a booster characterized in that said elastic means is a frustoconical helical spring whose larger-diameter base bears on the annular plate.

Another subject of the present invention is a booster characterized in that an annular groove is provided in the annular plate to receive the larger-diameter end of the frustoconical spring.

Another subject of the present invention is a booster characterized in that the central third part of the annular element has a tubular shape of longitudinal axis and extends in the direction of the master cylinder, and in that said piston tail comprises a cavity provided with an end wall and in which there bears an end of the central third part of the annular first element of tubular shape.

Another subject of the present invention is a booster characterized in that an end of the tube bearing against the end wall of the cavity is configured as a ball.

Another subject of the present invention is a booster characterized in that sealing between the outer wall of the pneumatic piston and the skirt is performed by an O-ring mounted in a groove made in the wall of the pneumatic piston.

Another subject of the present invention is a booster characterized in that the feeler is guided axially in the pneumatic piston by an annular throat formed in the inner wall of the pneumatic piston.

Another subject of the present invention is a booster characterized in that the reaction device comprises a floating element interposed between a second longitudinal end of the plunger and a master cylinder piston.

Another subject of the present invention is a booster characterized in that the reaction device also comprises a cage of maximum longitudinal extension in which there is mounted an elastic means mounted in reaction between a ring bearing against an annular bearing surface of the floating element and a collar mounted in an annular cavity made in the pneumatic piston, said collar comprising an orifice for the passage of a longitudinal end of the floating element, said collar and said ring being connected by a sleeve in which the ring is able to slide in the direction of the plunger.

Another subject of the present invention is a booster characterized in that the reaction device also comprises a reaction disk arranged in the chamber, said reaction disk bearing by a radially external part of a first face against the pneumatic piston and by a second face against a face forming a first end of said floating element, said face being borne by a disk secured to the floating element, and in that a clearance is provided between the rigid disk and a second central part of the reaction disk.

Another subject of the present invention is a booster characterized in that an annular sealing diaphragm is on the one hand clamped between the first and second shells and on the other hand overmolded onto a radially external end of the skirt.

Another subject of the present invention is a braking device comprising a master cylinder connected hydraulically to brakes arranged at the wheels of a motor vehicle, and a booster interposed between the master cylinder and a control rod moved by means of a brake pedal, said booster transmitting a force applied to the brake pedal and applying a pneumatic boost force to a piston of the master cylinder, characterized in that said booster is a booster according to the present invention.

The present invention has the advantage of reducing the radial forces applied to the tail of the master cylinder piston.

The present invention will be better understood with the aid of the description which will follow and of the appended figures in which the front and rear correspond respectively to the left and right of the drawings and in respect of which:

The same references will be used for the same elements having the same function for FIGS. 1, 2, 3, 4 and 5.

Figure 1:
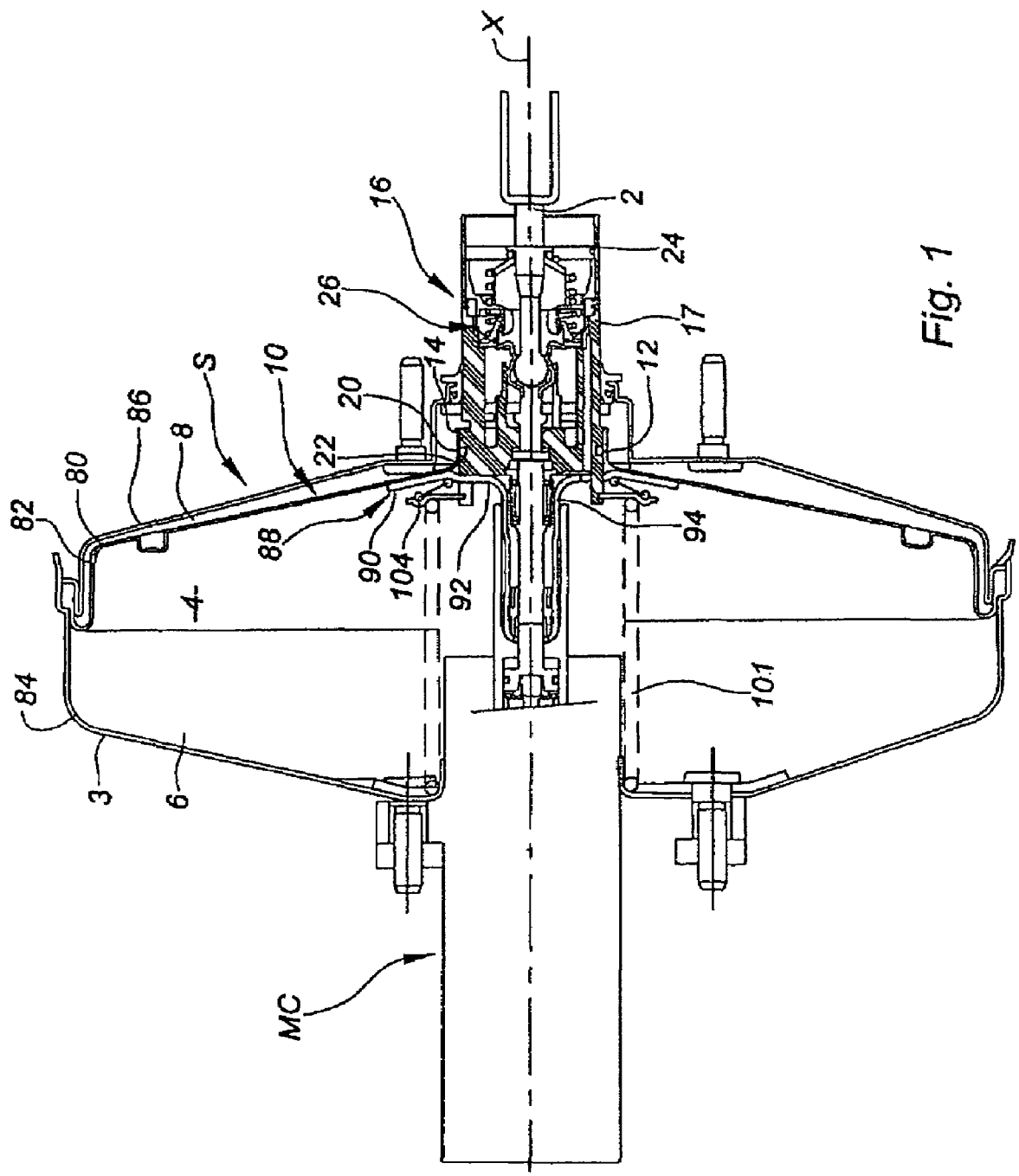
FIG. 1 is a view in longitudinal section of a first embodiment of a braking device according to the present invention.
Figure 3:
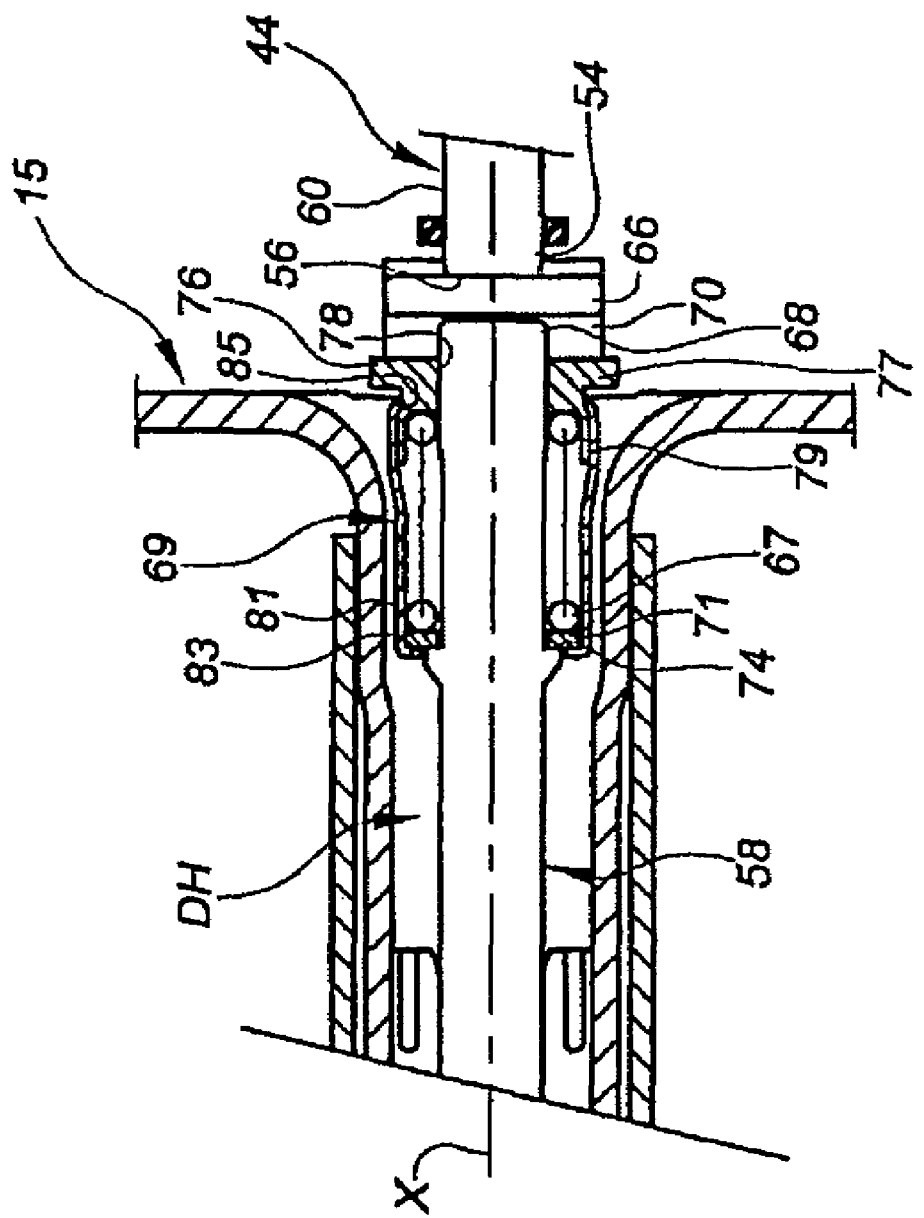

FIGS. 1 and 3 show a first embodiment of a braking device according to the present invention of longitudinal axis X comprising a pneumatic brake booster S and a master cylinder MC arranged at a first axial end of the booster opposite a second axial end of the booster directed toward a control rod 2 connected to a brake pedal (not shown).

The booster comprises a casing 3 of axis X defining a volume 4 divided into a low-pressure chamber 6 connected permanently to a low-pressure source, or front chamber, and into a variable-pressure chamber 8, or rear chamber, by a skirt 10 which is slidably mounted with sealing in the casing 3. The skirt 10 comprises a central orifice 12 bordered axially toward the control rod 2 by a hollow shaft 14 in which there is slidably mounted with sealing a first axial end 15 of a pneumatic piston 16 of axis X, likewise extended axially in the direction of the control rod and sliding in a sealed manner in the casing 4 by means of a lip seal 19.

The inside diameter of the hollow shaft is equal to the outside diameter of the first end 15 of the pneumatic piston so as to ensure substantially planar contact between the hollow shaft and the wall 18 of the first end 15 of the piston 16, improving the guiding of the skirt 10.

The sealing between the hollow shaft 14 and a radially external wall 18 of the piston 16 is achieved, in the example shown, by an O-ring 20 mounted in a groove 22 made in the wall 18 of the piston 16.

The pneumatic piston 16 is formed by a substantially cylindrical body 17 having a through passage 24 bored into it, in which passage there is mounted a three-way valve 26 actuated by the control rod 2.

The three-way valve 26 comprises an equalizing valve 28 which places the front chamber 6 and the rear chamber 8 in communication. The equalizing valve 28 comprises a valve seat 30 formed by an annular bearing surface made in the inner wall of the passage 24 and a shutter 32 formed by a radially external first part of an annular face 34, perpendicular to the axis X, of an elastomeric element of U-shaped cross section which is fixedly mounted in the body 17 of the piston 16. An elastic means 35, namely a helical spring in the example shown, is mounted to bear at the rear of the planar face 34 and a fixed annular bearing point 36 in the body of the piston 16 so as to confirm application of the shutter 32 to the valve seat 30.

The valve comprises an intake valve 38 placing the rear chamber 8 in communication with the high-pressure pneumatic fluid source, this being the environment at atmospheric pressure in the example in question. The intake valve 38 comprises an annular valve seat 40 borne by a rear axial first end 42 of a plunger 44 and a shutter 46 formed by a radially internal second part of the annular face 34.

In its receiving cavity 52 made in the rear first end 42, the plunger 44 receives a front end 50 of the control rod 2 configured as a ball. The valve seat 40 of the intake valve 38 borders the receiving cavity 52. At its front axial second end 54 opposite the first end 42, the plunger comprises a transverse surface 56, known as a feeler, intended to transmit the force applied to the control rod by the driver to the master cylinder and the force applied by the master cylinder in reaction to the driver.

The axial second end 54 is guided axially by an annular throat 60 formed by the body 17 of the piston 15 and having an inside diameter equal to the outside diameter of the front end 54 of the plunger 44.

The front second end 54 leads into a chamber 70 having a greater diameter than the outside diameter of the front end 54 of the plunger 44.

A floating element 58 of axis X bears against the feeler 56 of the plunger 44 and forms part of a hydraulic reaction device DH arranged in a tail 62 of a master cylinder piston 64.

In the example shown, a rigid disk 66 whose outside diameter is equal to the diameter of the chamber 70 is advantageously interposed between the axial second end 54 of the plunger 44 and a rear second end 68 of the floating element 58.

A spring 67 is mounted in a cylindrical cage 69 of maximum longitudinal extension determining the load on the spring, comprising a ring 71 against which a front first end of the spring bears and a collar 76 having an orifice 78 bored into it for the passage of the rear end 68 of the floating element 58, against which rear end a rear second end of the spring bears. The ring 71 is intended to bear against an annular bearing surface 74 projecting from the periphery of the floating element 58. The collar 76 is intended to be mounted by a rear first end in an annular housing 77 bordering the front end of the chamber 70. At a front second end, the collar 76 comprises a cylindrical extension 79 directed toward the master cylinder and forming a means for receiving and transversely retaining the rear end of the spring.

The cage also comprises a cylindrical sleeve 81 connecting the collar 76 and the ring 71. In the example shown, the sleeve comprises, at a front end, an annular bearing surface 83 extending radially toward the axis and forming a bearing point for the ring 71 and is crimped by a rear second end onto the periphery of the cylindrical extension 79 of the collar 76. Advantageously, the collar 76 comprises a radial kink 85 at the connection between the front face of the collar and the cylindrical extension 79, over which kink is attached the rear second end of the sleeve. The ring 71 is able to slide in the sleeve in the direction of the plunger.

The sealing between the front chamber and the rear chamber between a radially external end 80 of the skirt 10 and the casing 4 is achieved by means of an annular diaphragm 82 fastened to the skirt and to the casing, spreading out as the skirt is displaced in the casing.

The annular diaphragm 82 is, for example, clamped between first and second shells 84, 86 forming the casing and overmolded onto the radially external end 80 of the skirt.

The annular diaphragm is advantageously made of elastomer, for example rubber.

According to the present invention, the skirt can move axially with respect to the piston 16 over a defined travel corresponding to the distance separating a front face of the skirt in the rest position and a rear face of an annular plate 100 connected rigidly to the annular piston and arranged in the front chamber between the skirt and the first shell 84. The annular plate 100 is fastened rigidly to a front end 102 of axial arms 96 projecting from the front face of the pneumatic piston in the direction of the master cylinder. There are advantageously four axial arms which are angularly distributed in a uniform manner about the axis X and pass through openings 98 made in an annular element 88 bearing against the skirt.

The annular element 88 is arranged in the front chamber, bearing by a radially external first part 90 against the skirt, by a radially central second part 92 against the front face of the piston 16 and by a radially internal third part 94 against the tail of the master cylinder piston. The third part 94 transmits the boost force provided by the skirt to the master cylinder piston.

On the one hand, the annular plate 100 has a first face forming a bearing point for an axial first end of a return spring 101 for returning the piston 16 to the rest position, said return spring being mounted to bear between the first shell and the annular plate 100.

On the other hand, the annular plate also has a second face forming a bearing point for an elastic return means 104 for returning the skirt to the rest position, for example a helical spring, which is advantageously frustoconical with its conicity directed toward the control rod 2, mounted between the annular element 88 and the annular plate 100.

Advantageously, an annular groove 106 for receiving a first turn of the spring 104 is provided in the annular plate 100.

The annular groove 106 for receiving the frustoconical spring 104 is advantageously produced by stamping, thus forming on the front face of the annular plate an annular bead 103 for transversely retaining the return spring 101. The skirt 10 is likewise returned to the rest position by way of the spring 104 transmitting the displacement of the annular plate 100 to the annular element 88.

In a known way, the skirt is returned to its rest position by the return springs of the master cylinder; however, it is preferable to reduce the load on said springs for safety reasons. Consequently, the return spring 104 is added. However, a booster not having a return spring exclusively for the skirt does not depart from the scope of the present invention.

The annular plate is advantageously mounted by bayonet mounting, the radially internal periphery of the annular plate 100 and the front end of the arms comprising notches able to cooperate with one another when the annular plate 100 is rotated with respect to the arm 96 of the piston 16 by a defined degree, but mounting by snap fastening is conceivable.

We will now describe the operation of the booster according to the present invention.

When the control rod is depressed along the axis X in the direction of the arrow, the equalizing valve 28 closes, isolating the front chamber from the rear chamber, and the supply valve opens, allowing the rear chamber to be supplied with high-pressure pneumatic fluid.

Owing to the pressure difference prevailing between the front chamber and the rear chamber, the skirt is displaced in the direction of the arrow in the casing 4 and with respect to the piston 16, which remains immobile. The skirt takes the annular first element 88 along with it. The spring 104 is then compressed by the annular element 88 being brought closer to the annular plate 100. Beyond a certain travel, the annular element 88 strikes against the annular plate 100, the movements of the skirt 10 and of the piston 16 then being connected.

The displacement of the piston 10 then allows the driver to regulate the braking level by depressing the brake pedal to a greater or lesser degree.

The free travel C of the skirt 10 with respect to the piston is advantageously selected so that it corresponds to the dead travel of the master cylinder, that is to say to the required travel of the piston in the master cylinder to obtain the start of the rise in pressure of the brake fluid in the brakes. However, it goes without saying that the scope of the present invention is not departed from by selecting a travel C which is greater or smaller than the dead travel of the master cylinder depending on the sensation through the pedal that it is desired to achieve.

Consequently, the driver feels through the pedal only the travel required for closing the equalizing valve and for opening the intake valve and does not feel the dead travel of the master cylinder. Driver comfort is thus increased since the driver experiences the sensation of immediate braking.

Advantageously, the central third part 94 of the annular element 88 is formed by a tube 108 forming a push rod and bearing against the end wall of a cavity 106 made in the piston tail.

The tube 108 of the annular element 88 comprises an axial first end 110 which bears against the end wall of the cavity 106 and is in the form of a ball so as to limit the transverse forces applied to the piston tail, thus reducing the risks of damage to the master cylinder in the event of non-perfect coaxiality between the booster and the master cylinder.

The floating element 58 is mounted in the tube 108, a passage 112 being provided at the end 110 of the tube bearing against the end wall of the cavity 106 to allow the passage of the floating element 58.

Figure 2:
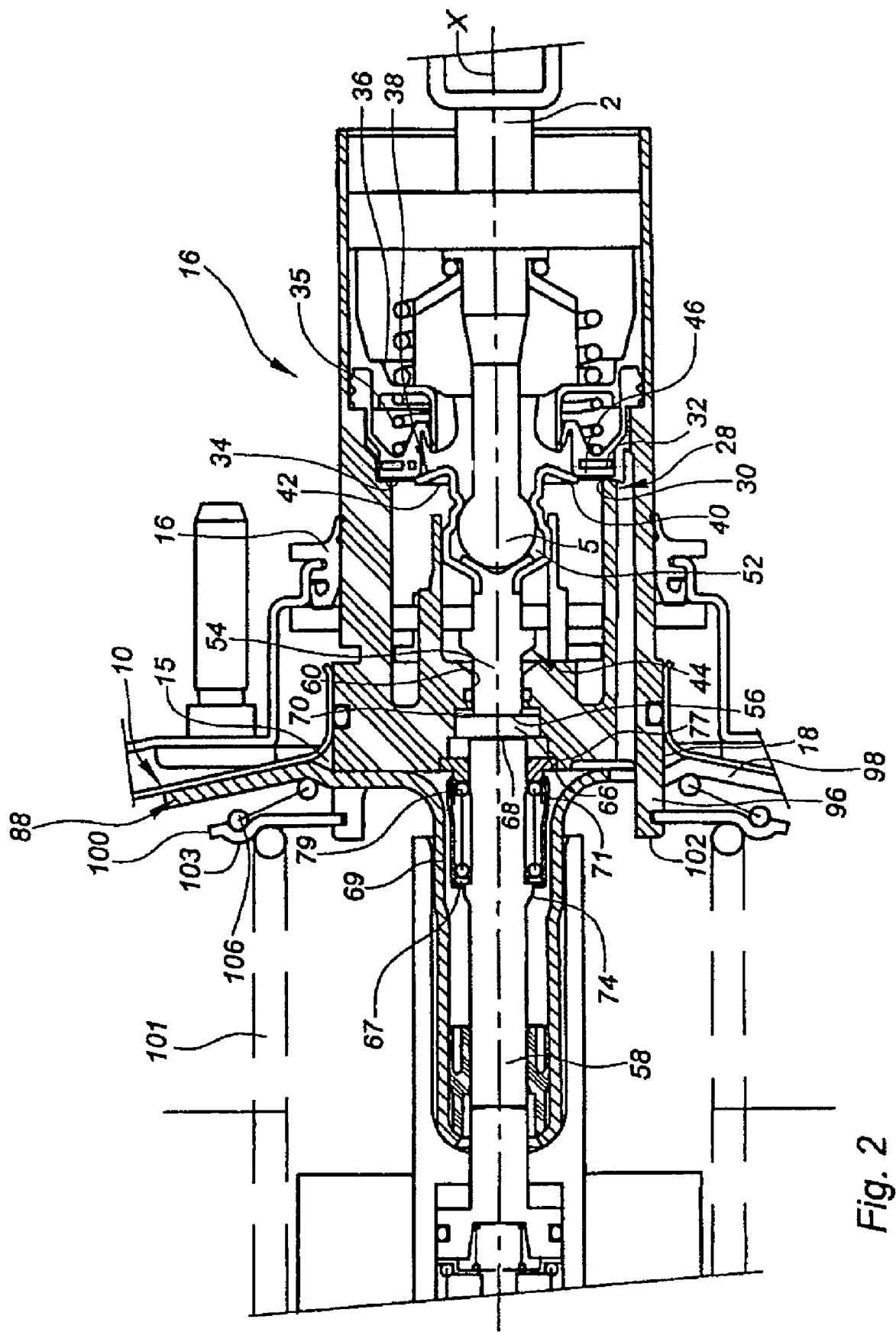
FIGS. 2 and 3 are views showing enlarged details of FIG. 1.

The device of FIGS. 1, 2 and 3 provides the driver with a very sporty sensation through the pedal. This is because the reaction retransmitted to the driver by the reaction device DH gives the sensation of very responsive braking. However, a certain number of drivers prefer a softer sensation.

Figure 4:
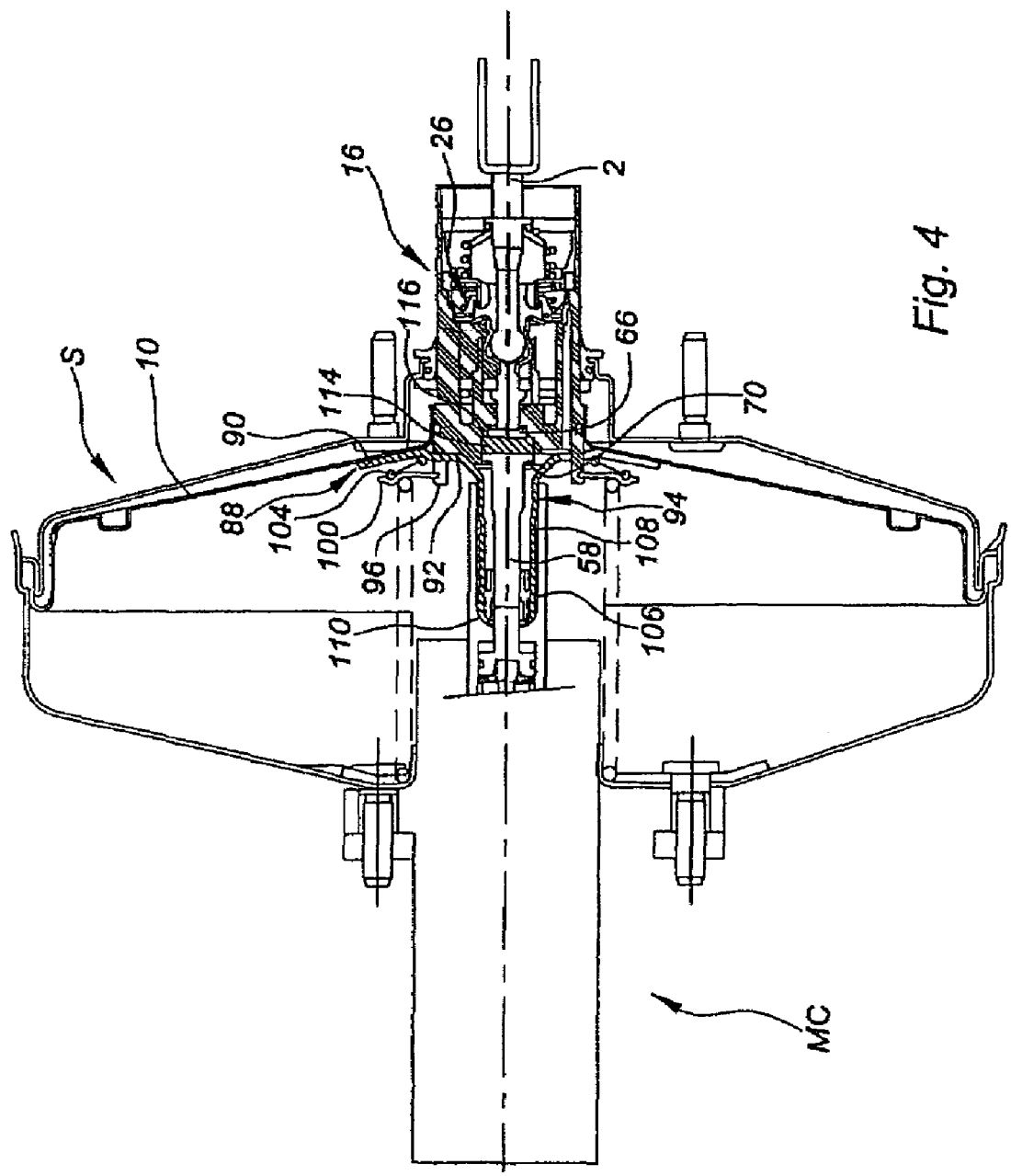
FIG. 4 is a view in longitudinal section of a second embodiment of a braking device according to the present invention.
Figure 5:
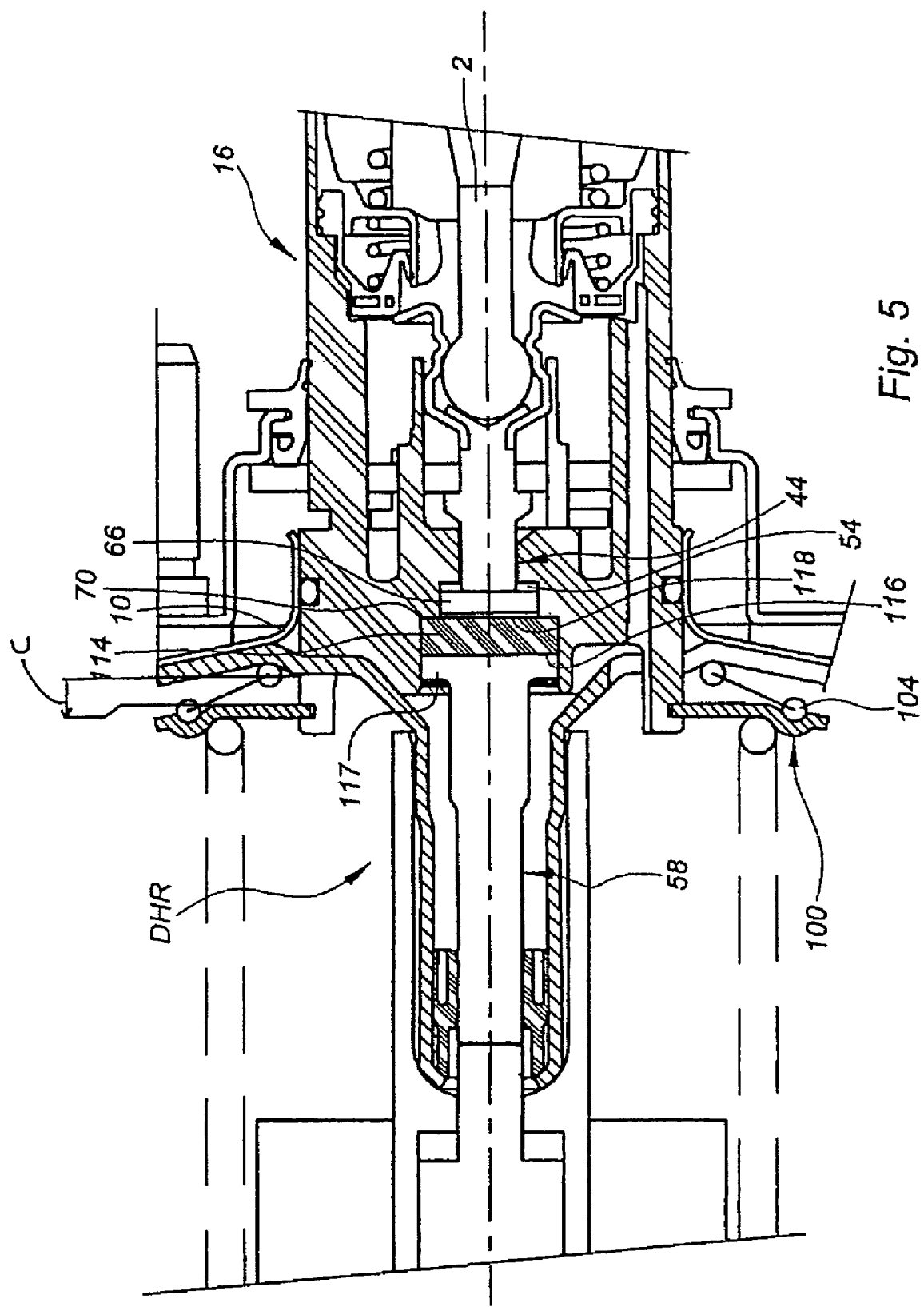
FIG. 5 is a view showing an enlarged detail of FIG. 4.

FIGS. 4 and 5 show a second embodiment in which the sensation through the pedal is optimized so that it can be adapted to drivers preferring a more traditional braking sensation. To this end, the reaction device DHR comprises a reaction disk 114 of substantially incompressible material arranged between the rigid disk 66 and the rear end of the floating element in the chamber 70. The reaction disk bears by a radially external part 116 of its rear face against the reaction piston and by its front face against a face of a disk which is coaxial with the axis X and secured to the rear end of the floating element 58. A clearance is provided between the rigid disk 66 and a central part 118 of the rear face of the reaction disk and determines the jump of the booster.

The reaction disk is made up of a first force applied by the plunger, a second force applied by the pneumatic piston to the radially external part 116 of the rear face of the reaction disk, and the reaction force applied by the floating element 58.

The sensation through the pedal felt by the driver is similar to the sensation felt with a traditional booster comprising only a reaction disk bearing by its front face on a rear longitudinal end of the push rod, yet suppressing the dead travel sensation of the master cylinder.

The master cylinder is advantageously a tandem master cylinder comprising first and second hydraulic circuits provided respectively with a primary piston and a secondary piston sliding in a sealed manner in the body of the master cylinder, the primary piston receiving the force applied to the pedal and the boost force supplied by the skirt.

It goes without saying that it would be possible to conceive of producing the skirt and the annular element so that they are fixed with respect to one another, for example by welding, or in a single piece.

A booster of simple design allowing a marked improvement in the sensation through the pedal owing to the dead travel at the master cylinder has been produced effectively; moreover, the booster according to the present invention makes it possible in a simple manner to offer a greater or lesser sporty pedal sensation depending on the wishes of the motor vehicle manufacturer.

Moreover, by virtue of its simple structure, the braking device according to the present invention allows rapid integration requiring only minor modifications to means which assist emergency braking which, for example, maintain the pressure in the master cylinder even after the brake pedal has been partially released.

The present invention applies mainly to the motor vehicle brake industry, in particular with respect to specific vehicles.

What is claimed:

1. A pneumatic brake booster comprising a casing (4) of longitudinal axis (X) formed by first and second shells (84, 86) connected by their radially external ends, in which casing a skirt (10) of longitudinal axis (X) is slidably mounted with sealing, said skirt dividing the interior space of the casing (4) into a low-pressure front chamber (6) and into a variable-pressure rear chamber (8), a pneumatic piston (16) of longitudinal axis mounted in a central orifice (12) in said skirt (16), a return spring (101) for returning the pneumatic piston to the rest position being mounted in the low-pressure chamber (6) between the first shell (84) and an annular plate (100) which is arranged in the low-pressure chamber substantially perpendicularly to the longitudinal axis and is connected rigidly to the pneumatic piston (16) by axial arms (96) passing through the skirt (10), a three-way valve actuated by a control rod (2) that is mounted in a longitudinal passage (24) bored into the pneumatic piston (16), said control rod being connected by a first longitudinal end to a brake pedal and a second end (50) of said control rod being received in a receiving cavity (52) in a first longitudinal end (42) of a plunger (44), a second longitudinal end of the plunger opposite the first end (42) of the plunger is guided in the pneumatic piston, said plunger comprising a transverse surface (56) for applying the force of the control rod to a piston of a master cylinder by way of a reaction device (DH, DHR), said skirt (10) slides axially relative to the pneumatic piston (16) over a defined travel (C) in a first phase of a braking action, said skirt (10) transmitting a pneumatic boost force to the hydraulic piston of the master cylinder via its central part, characterized in that when the skirt has completed said defined travel (C), said skirt takes the pneumatic piston (16) along with it by way of said annular plate (100).

2. The booster according to claim 1, characterized in that the pneumatic piston (16) is substantially cylindrical and is slidably mounted with sealing in a hollow shaft (14) bordering the central orifice (12) in the skirt (10), said hollow shaft being directed toward the pedal.

3. The booster according to claim 2, characterized in that said longitudinal end of the skirt directed toward the pedal comprises a hollow shaft whose inside diameter is substantially equal to the outside diameter of the pneumatic piston (16).

4. The booster according to claim 3, characterized in that the skirt transmits the booster force to the master cylinder piston by way of an annular element (88) bearing against the skirt and carried along by said skirt upon a braking action, comprising a radially external first part (90) that bears against a front face of the piston (16), a radially central second part (92) that bears against the front face of the piston (16), and a radially internal third part (94) that bears against a tail of the master cylinder piston.

5. The booster according to claim 4, characterized in that there are four axial arms (96) which are angularly distributed in a uniform manner and pass through the skirt by way of openings made in the second central part (92) of the annular first element (88).

6. The booster according to claim 4, characterized in that an elastic means (104) is mounted between the radially external first part (90) of the annular element and the annular plate.

7. The booster according to claim 6, characterized in that said elastic means is a frustoconical helical spring whose larger-diameter base bears on the annular plate (100).

8. The booster according to claim 7, characterized in that an annular groove is provided in the annular plate (100) to receive the larger-diameter end of the frustoconical spring (104).

9. The booster according to claim 8, characterized in that the central third part (94) of the annular element (88) has a tubular shape (108) of axis X and extends in the direction of the master cylinder, and in that said piston tail comprises a cavity (106) provided with an end wall and in which there bears an end (110) of the central third part (94) of the annular first element of tubular shape.

10. The booster according to claim 9, characterized in that an end of the tube (108) bearing against the end wall of the cavity (106) is configured as a ball.

11. The booster according to claim 10, characterized in that sealing between the outer wall of the pneumatic piston (16) and the skirt is performed by an O-ring mounted in a groove made in the wall of the pneumatic piston (16).

12. The booster according to claim 11, characterized in that the plunger is guided axially in the pneumatic piston (16) by an annular throat (60) formed in the inner wall of the pneumatic piston (16).

13. The booster according to claim 12, characterized in that the reaction device (DH, DHR) comprises a floating element interposed between a second longitudinal end (54) of the plunger (44) and a master cylinder piston.

14. The booster according to claim 13, characterized in that the reaction device (DH) also comprises a cage (79) of maximum longitudinal extension in which there is mounted an elastic means (67) mounted in reaction between a ring (71) bearing against an annular bearing surface (74) of the floating element and a collar (76) mounted in an annular cavity (77) made in the pneumatic piston (16), said collar (76) comprising an orifice for the passage of a longitudinal end of the floating element, said collar (76) and said ring (71) being connected by a sleeve (81) in which the ring (71) is able to slide in the direction of the plunger.

15. The booster according to claim 13, characterized in that the reaction device (DHR) also comprises a reaction disk (114) arranged in a chamber (70) receiving the second longitudinal end (54) of the plunger (44), said reaction disk bearing by a radially external part (116) of a first face against the pneumatic piston (16) and by a second face against a face forming a first end of said floating element, said face being borne by a disk secured to the floating element (58), and in that a clearance is provided between the rigid disk (66) and a central second part (118) of the reaction disk (114).

16. The booster according to claim 15, characterized in that an annular sealing diaphragm (82) is on the one hand clamped between the first and second shells (84, 86) and on the other hand overmolded onto a radially external end of the skirt (10).

17. The booster according to claim 16 for use in a brake system including a master cylinder connected hydraulically to brakes arranged at the wheels of a motor vehicle, and wherein said booster is interposed between the master cylinder and a control rod moved by means of a brake pedal, said booster transmitting a force applied to the brake pedal and applying a pneumatic boost force to a piston of the master cylinder.

* * * * *